United States Patent [19]

Bales

[11] Patent Number: 5,308,030
[45] Date of Patent: May 3, 1994

[54] BICYCLE SEAT SUSPENSION ASSEMBLY

[75] Inventor: David W. Bales, High Point, N.C.

[73] Assignee: Mobitech, Incorporated, Montpelier, Ohio

[21] Appl. No.: 966,556

[22] Filed: Oct. 26, 1992

[51] Int. Cl.⁵ .................................................. B62K 19/36
[52] U.S. Cl. .................................... 248/214; 280/283; 280/287
[58] Field of Search ............... 248/214, 580, 592, 598; 280/220, 283, 287

[56] References Cited

U.S. PATENT DOCUMENTS

| | | | |
|---|---|---|---|
| 3,623,749 | 11/1971 | Jensen | 280/287 |
| 3,990,717 | 11/1976 | Best | 280/287 |
| 4,934,724 | 6/1990 | Allsop et al. | 280/281.1 |
| 5,044,698 | 9/1991 | Knapp | 280/283 |

FOREIGN PATENT DOCUMENTS 20802 11/1895 United Kingdom ............... 280/283

*Primary Examiner*—Richard K. Seidel
*Assistant Examiner*—Hwei-Siu Payer
*Attorney, Agent, or Firm*—Emch, Schaffer, Schaub & Porcello Co.

[57] ABSTRACT

A seat suspension assembly is disclosed for a bicycle having an upper horizontal frame member. A boom member is pivotally attached at its front end adjacent the front end of the bicycle frame member. A support assembly having a seat mounted adjacent its upper end is connected to the boom member at its rear end. A tension member extends between the boom member and the bicycle frame member for applying a tension force when the bicycle hits a bump to urge the boom toward a position generally horizontal to the horizontal frame member.

14 Claims, 4 Drawing Sheets

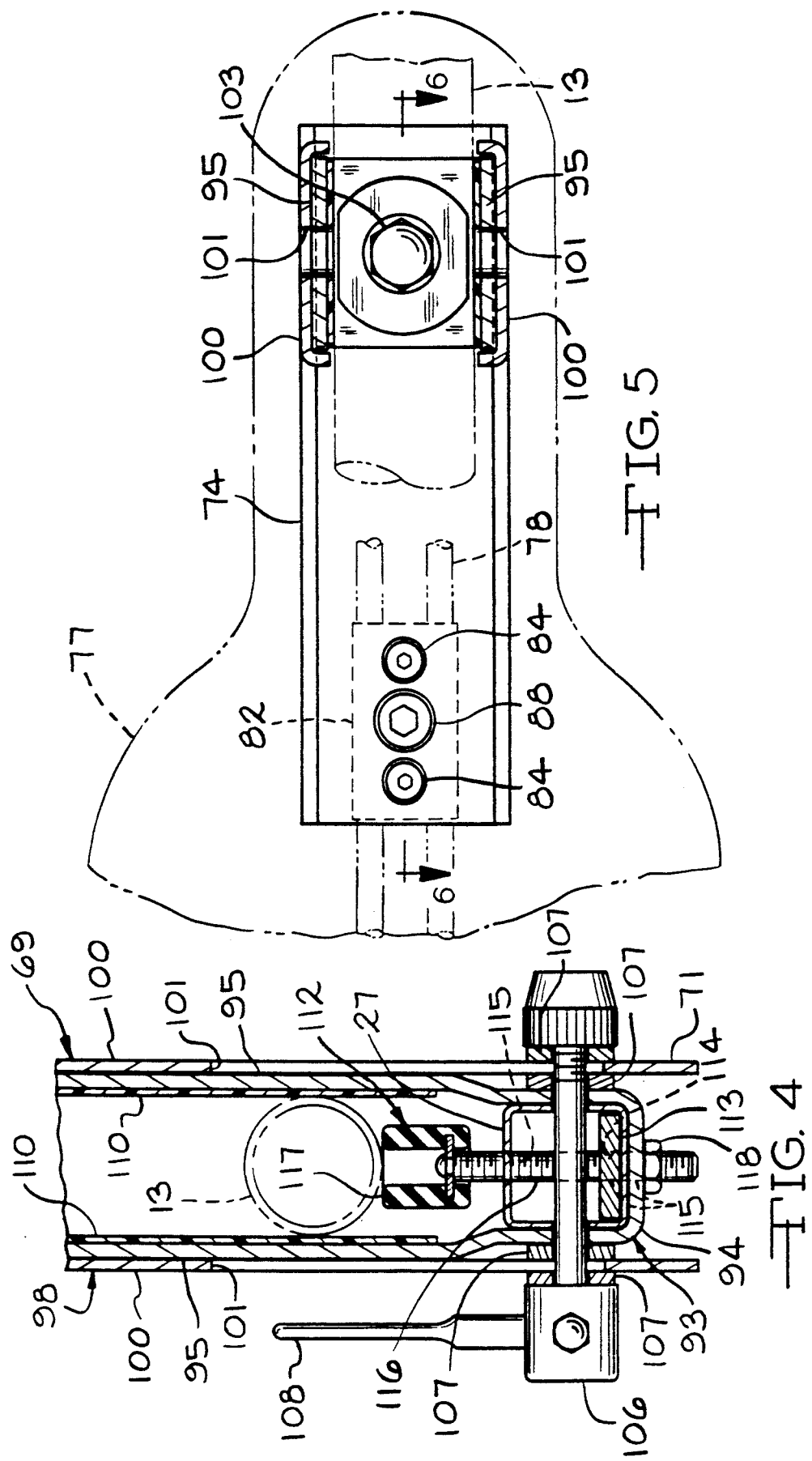

BICYCLE SEAT SUSPENSION ASSEMBLY

BACKGROUND OF THE INVENTION

The present invention relates to an improved bicycle suspension and more particularly to an improved bicycle seat suspension assembly.

In many prior art seat suspensions the force of the bicycle hitting, for example, a bump in the road results in a force being transmitted through the bicycle frame, the seat and to the rider.

U.S. Pat. No. 4,934,724 attempts to lessen such transmitted force by providing a flexible beam which is connected at one end to the bicycle frame while the other end mounts the bicycle seat. A portion of the beam includes a rigid foam core. However, the road forces, while lessened by the flexible beam are still transmitted through the bicycle seat to the rider.

The present invention relates to an improved bicycle suspension assembly where the mass of the rider on the seat holds the seat relatively constant and the road forces separate the pivotally joined upper horizontal bicycle frame member and a boom member. A torsion member mounted between the frame member and the boom member urges the two members toward a generally horizontal position. The primary object of the present invention is to provide an improved bicycle seat suspension assembly where road forces transmitted to the rider through the seat are greatly lessened.

SUMMARY OF THE INVENTION

The present invention relates to a seat suspension assembly for a bicycle. The bicycle includes an upper horizontal frame member having a front end adjacent the front wheel and a rear end adjacent the rear wheel.

A longitudinally extending boom member having a first end and a second end is pivotally connected to the horizontal frame member adjacent its front end.

A tension means is mounted between the boom member and the frame member for urging the boom member and the frame member toward a generally parallel position.

A generally vertical support assembly which is preferably adjustable is mounted at its lower end adjacent the second or rear end /f the boom member. The support assembly mounts a seat assembly at its upper end.

Other features of the present invention will be apparent from the following description of the preferred embodiment and from the accompanying drawings.

BRIEF DESCRIPTION OF THE DRAWINGS

FIG. 4 is a fragmentary, enlarged cross sectional view taken along the line 4—4 of FIG. 1;

FIG. 5 is an enlarged cross sectional view taken along the line 5—5 of FIG. 1 and showing the bottom of the seat assembly.

DETAILED DESCRIPTION OF THE PREFERRED EMBODIMENT

Figure 1:
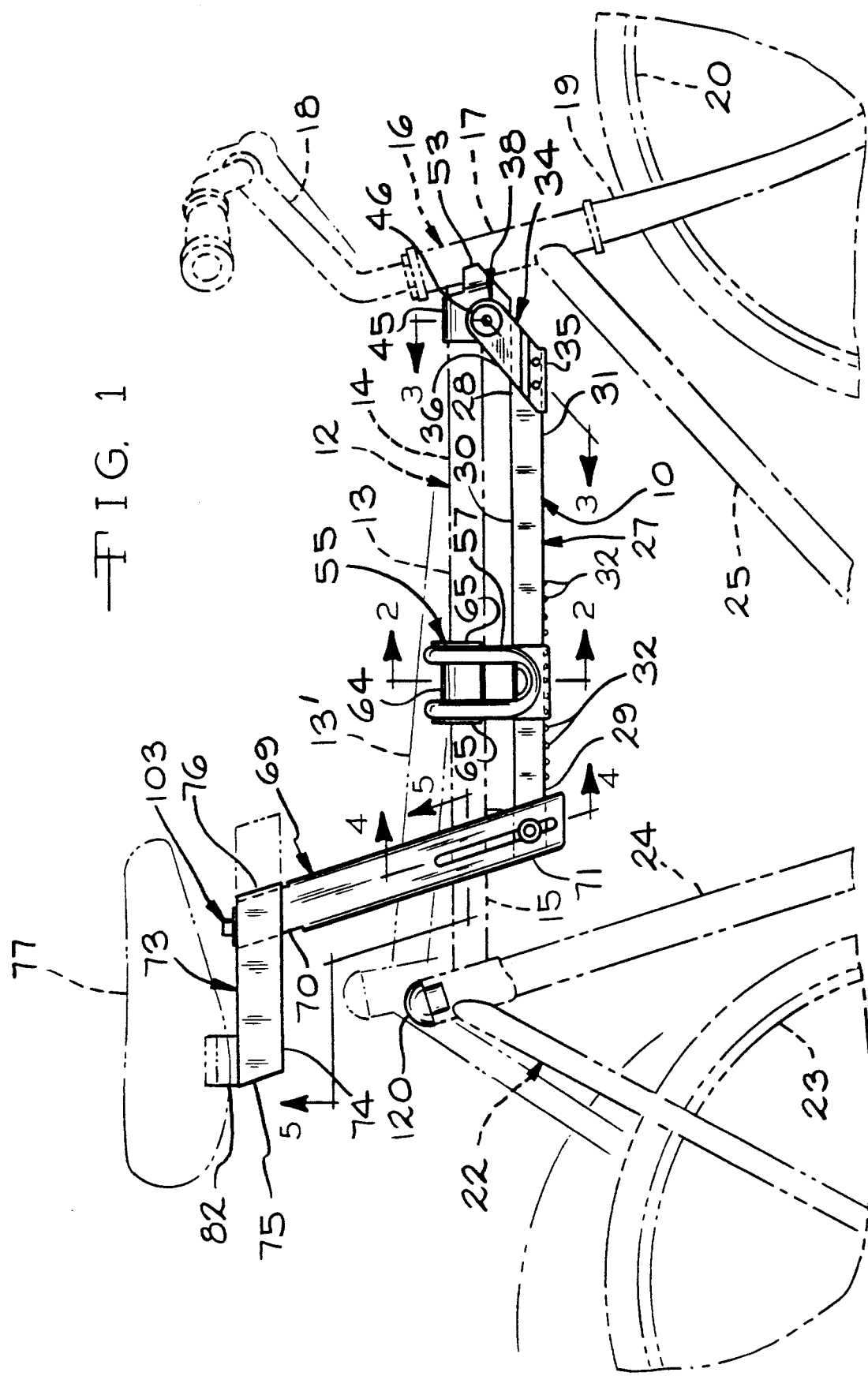
FIG. 1 is a side elevational view of a bicycle seat suspension assembly, according to the present invention, with the remainder of the bicycle shown by dashed lines.

A seat suspension assembly, according to the present invention, is generally indicated in FIG. 1 by the reference number 10. The seat suspension assembly 10 may be part of an original equipment bicycle or, as depicted in the present drawing, a retrofit kit assembly added to an existing bicycle 12. The bicycle 12 includes a generally horizontal frame member 13 having a front end 14 and a rear end 15. The frame member 13 extends from a front handlebar and front wheel assembly mounting assembly 16. The assembly 16 includes a vertical post member 17 and a handlebar 18. A fork 19 mounts a front wheel 20. The bicycle 12 also includes a rear frame assembly 22 mounting a rear wheel 23. A tubular post 24 extends upwardly from the hub of the sprocket assembly (not shown) and is connected by welding or other means to the rear frame assembly 22 and to the rear end 15 of the horizontal frame member 13. A frame post 25 also extends from the vertical post member 17 to the hub (not shown) of the sprocket assembly. Many changes may be made to the exact configuration and parts of the bicycle 12. The seat suspension assembly 10 of the present invention is designed for use of bicycles having many configurations, parts and sizes.

The components of the seat suspension assembly 10 are illustrated in the drawing as being constructed of formed metals. The components may also be constructed of plastic. The components may also have different, for examples, tubular or round shapes or cross sections and still fall within the scope of the present invention The seat suspension assembly 10 includes a longitudinally extending boom member 27 having a first end 28, a second end 29, a top 30 and a bottom 31. In the present embodiment, the boom member 27 is rectangular in cross section and defines a plurality of spaced protuberances 32 located at predetermined positions along the bottom 31 of the boom member 27.

The first end 28 of the boom member 27 is pivotally connected to the front end 14 of the horizontal frame member 13.

Figure 3:
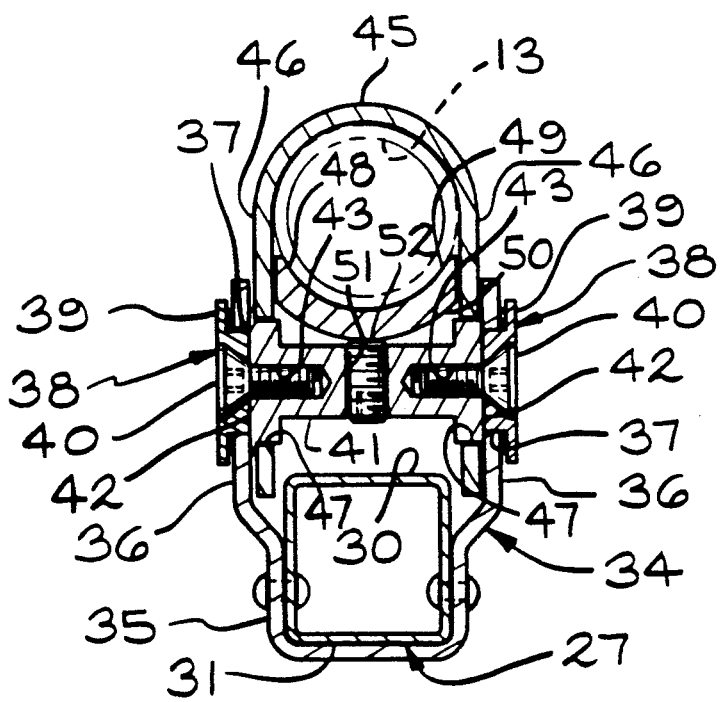
FIG. 3 is an enlarged cross sectional view taken along the line 3—3 of FIG. 1.

Referring to FIGS. 1 and 3, a connection assembly 34 pivotally connects the first end 28 of the boom member 27 to the horizontal frame member 13 adjacent the front end 14. The connector assembly 34 includes a base member 35 riveted or otherwise connected to the boom member 27. The base member 35 includes a pair of upwardly extending legs 36. The legs 36 define openings 37 which receive pivot pins 38. The pivot pins 38 include bearings 39 and screws 40. A core member 41, having outer ends 42, extends between the legs 36. The surfaces of the ends 42 define threaded openings 43 which receive and engage the screws 40.

A U-shaped mounting member 45 has depending side members 46 which overlie the respective legs 36 of the base member 35. The side members 46 define openings 47 which receive the outer ends 42 of the core member 41. The core member 41 is thereby connected to the mounting member 45 and pivotally connected to the base member 35 by the pivot pins 38. Referring to FIG. 3, a clamp member 48 having a curved surface 49 and an opposed surface 50 is mounted between the depending side members 46. A threaded opening 51 is provided through the core member 41 and receives a set screw 52 which engages the opposed bottom surface 50 of the clamp member 48 to urge the curved upper surface 49 of the clamp member 48 into tight engagement with the horizontal frame member 13 of the bicycle 12. The adjusting set screw 52 holds the clamp member 48 against bicycle frame members having, for example, various diameters.

In the preferred embodiment, shown in FIG. 1, said mounting member 45 includes a pair of opposed and forwardly projecting ears 53 which are positioned on opposite side of the bicycle vertical post member 17 to limit relative rotation of the boom member 27 and the bicycle horizontal frame member 13.

Figure 2:
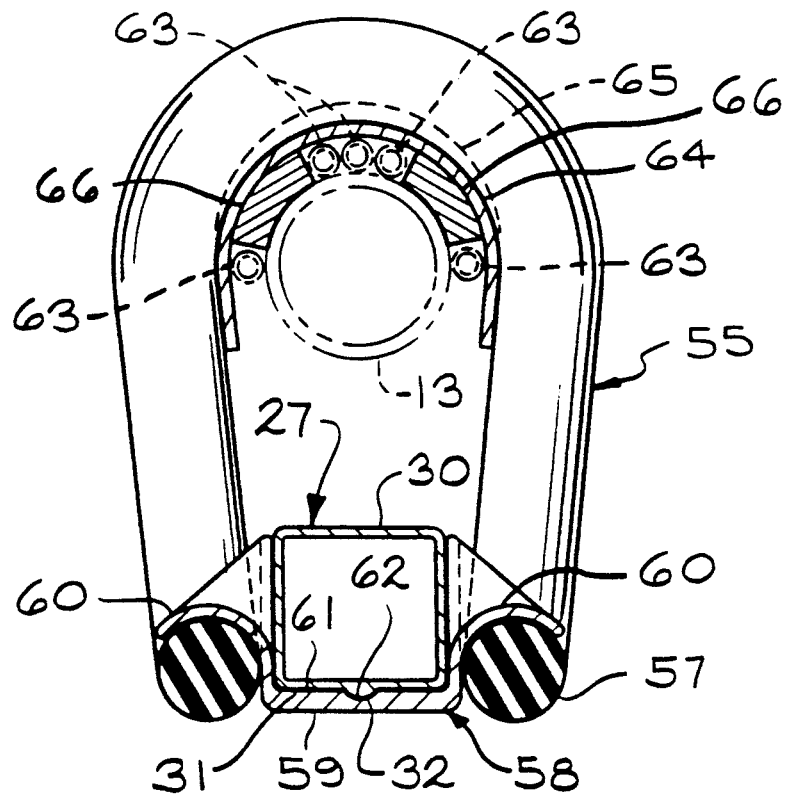
FIG. 2 is an enlarged cross sectional view taken along the line 2—2 of FIG. 1.

Referring to FIGS. 1 and 2, a tension means 55 is connected between the horizontal frame member 13 and the boom member 27 at a position rearward from the connector assembly 34. The tension means 55 applies a tension force between the bicycle frame member 13 and the boom member 27. Because of the mass of the rider, when a bump is hit, the boom member 27 and the horizontal frame member 13 pivot relative to one another and the rear end 15 separates further from the second end 29 as indicated by the dashed line position 13' indicated in FIG. 1. The tension means 55 urges the horizontal frame member 13 and the boom 27 toward the generally horizontal position shown in FIG. 1.

The preferred torsion means 55, includes a continuous length of elastomeric member 57. The diameter of the elastomeric member 57 may be varied to adjust the applied forces. Other types of spring members may be utilized and fall within the scope of the invention. For example one or more metal torsion springs could be used. The size and number of the tension springs can also be varied. In addition, one or more non-continuous elastomeric spring like members could be utilized. More than one continuous elastomeric member can also be used.

The tension means 55 can remain stationery. However, in the preferred embodiment, shown in the drawings, the tension means 55 is movable toward and away from the pivotable connector assembly 34 to adjust the length of the lever arm and thereby adjust the spring force generated by the tension means 55.

The tension means 55 includes a bracket 58 (see FIG. 2) having a bottom 59 and opposed curved and outwardly extending wing members 60. The bottom 59 has an upper surface 61 which defines a plurality of spaced detents 62 which mate with the spaced protuberances 32 provided in the bottom 31 of the boom member 27.

The bracket 58 is movably mounted on the boom member 27. The detents 62 and protuberances 32 serve as indexing means for holding the bracket 58 to the boom member 27 at one of a plurality of predetermined positions. While the bracket 58 is preferably mounted on the boom member 27, it may be mounted on the bicycle horizontal frame member 13 with the elastomeric member 57 extending around the boom member 27 rather than around the frame member 13, as shown in FIGS. 1 and 2.

In the present embodiment, the continuous elastomeric member 57 extends around the frame member 13 and is connected to both of the opposed wing members 60 to hold the bracket 58 securely against the boom member 27.

Referring to FIG. 2, on some bicycles a plurality of cables 63 extend along the horizontal frame member 13. The cables 63 are used for various mechanical and electrical uses, such as brake cables, derailer cables and electrical light cables. In a preferred embodiment a curved guide member 64 having side flanges 65 (see FIG. 1) is positioned over the cables 64 and frame member 13. The side flanges 65 hold the elastomeric member 57 in its desired position. Spacers 66 are positioned adjacent the cables 63 to hold the guide member 64 away from the cables 63.

To adjust for the weight of a significantly heavier or lighter rider, the ends 15 and 29 of the frame member 13 and boom member 27 are moved toward one another to lessen the tension forces so that the tension means 55 may be moved rearwardly or forwardly. In some situations it is possible that the elastomeric member will also have to be replaced with one having a different spring force.

Referring to FIGS. 1 and 4, a support assembly 69, having an upper end 70 and a lower end 71, has its lower end 71 connected to the longitudinally extending boom member 27 adjacent the rear end 15.

A seat assembly 73 is mounted adjacent the upper end 70 of the support assembly 69. The seat assembly 73 includes a horizontally extending channel member 74, having a rear end 75 and a front end 76, connected to the upper end 70 of the support assembly 69.

A bicycle seat 77 is mounted on the rear end 75 of the horizontally extending channel member 74. The bicycle seat 77 includes a frame 78 on its bottom side which mounts a clip 79 having an opening 80 extending therethrough. A mounting block 82 having a curved surface 83 complementary with the clip 79 is secured to the rear end 75 of the channel member 74 by a pair of screws 84. The mounting block 82 defines an opening 87 and a bolt and nut assembly 88 removably secures the seat 77 to the mounting block 82 and channel member 74. The horizontally extending channel member 74 includes a top 89 and a pair of depending side members 90. The side members 90 can be provided with, for example, decorative slots or openings (not shown) if desired. In another embodiment (not shown) the support assembly 69 and seat assembly 73 are joined. The upper end 70 of the support assembly 69 is integrally connected to the front end 76 of the seat assembly 73. In that embodiment, the mounting block 82 is movable along the channel member 74 for fore and aft adjustment of the bicycle seat 77.

Figure 6:
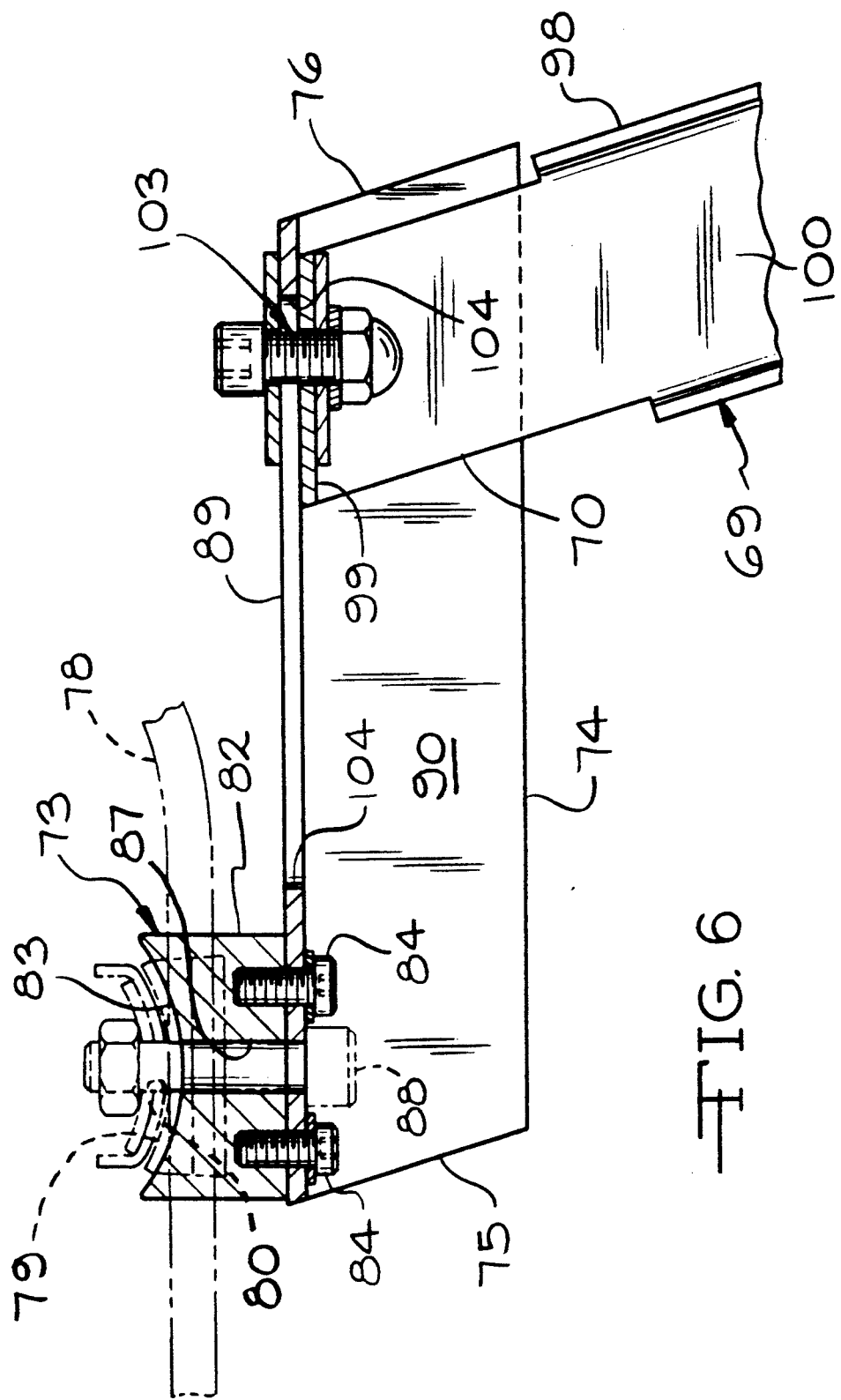
FIG. 6 is a fragmentary cross sectional view taken along the line 6—6 of FIG. 5.

Referring to FIGS. 1, 4 and 6, the support assembly 69 includes a vertically extending receiver bracket 93 having a base 94 fixed to the second end 29 of the boom member 27. The receiver bracket 93 also includes a pair of integral upstanding guide members 95 which extend from the base 94. A vertically movable mounting frame 98 includes a top member 99 and opposed downwardly extending legs 100 which overlie and are positioned adjacent the guide members 95 of the receiver bracket 93. The legs 100 define longitudinally extending vertical slots 101.

Referring to FIG. 6, the top member 99 of the mounting frame 98 is secured to the horizontally extending channel member 74 by a nut and bolt assembly 103.

The top 89 of the channel member 74 includes a longitudinally extending slot 104. To adjust the bicycle seat 77 with respect to the front of the bicycle 12, the nut and bolt assembly 103 is loosened and moved within the slot 104. When the desired seat position is reached, the nut and bolt assembly 103 is tightened to secure the channel member 74 and bicycle seat 77 to the support assembly 69.

A releasable locking assembly 106, known in the art, extends through the vertical slots 101 in the legs 100 of the mounting frame 98, through the guide members 95 of the receiver bracket 93 and through the boom member 27. Locking members 107 are provided between the components. The locking assembly 106 releaseably holds the legs 100 and guide members 95 in a predetermined vertical position. The locking assembly 106 is shown in its locked position. A lever 108 is rotated to move the assembly 106 to an unlocked position where the relative vertical position of the legs 100 may be adjusted relative to the guide members 95.

Referring to FIG. 4, shims 110 of varying thickness can be provided to compensate for different diameters of the bicycle horizontal frame member 13.

In the preferred embodiment, shown in FIG. 4, an adjusting assembly 112 is provided within the receiver bracket 93 for adjusting the distance between the horizontal frame member 13 and the boom member 27. A plate 113 having a threaded opening 114 extending therethrough is secured to the base 94. Complementary openings 115 are provided in the base 94 and the boom member 27. A threaded adjusting screw 116 having a pad 117 mounted at its upper end extends through the openings 114, 115. The screw 116 is adjusted vertically until the bicycle horizontal frame member 13 and the boom member 27 are positioned in the generally parallel alignment shown in FIGS. 1 and 4. A locking nut 118 secures the vertical position of the screw 116 and its pad 117.

During operation, the frame member 13 moves away from the elastomeric pad 117 and rides along the shims 110. When the frame member 13 again moves toward the boom member 27 it engages the elastomeric pad 117.

In this embodiment, an elastomeric bumper 120 (see FIG. 1) is positioned at the upper end of the vertical bicycle post 24. If the seat 77 bottoms out, it engages the bumper 120.

Many revisions may be made to the above described embodiments without departing from the invention or from the following claims.

I claim:

1. A seat suspension assembly in combination with a bicycle having a generally horizontal frame member extending from a front handlebar and front wheel mounting assembly to a rear frame and rear wheel mount assembly, said horizontal frame member having a front end and a rear end, said seat suspension assembly comprising
   a longitudinally extending boom member having a first end and a second end, said first end being pivotally connected to the front end of the horizontal frame member,
   a support assembly having an upper end and a lower end, said lower end of said support assembly connected to said longitudinally extending boom member adjacent its second end,
   a seat assembly mounted adjacent said upper end of said support assembly, and
   tension means for applying a tension force between the bicycle horizontal frame member and said longitudinally extending boom member.

2. The combination according to claim 1, wherein said tension means includes a tension member connected between the horizontal frame member and said boom member.

3. The combination according to claim 2, wherein said tension member is a length of elastomeric material.

4. The combination according to claim 1, wherein said tension means includes a bracket having opposed outwardly extending wing members mounted between said boom member and the horizontal frame member and a tension member extending between said boom member and the horizontal frame member, said tension member being connected to said wing members.

5. The combination according to claim 4, wherein said bracket is mounted on said boom member and said tension member comprises a continuous elastomeric tension member surrounding the bicycle horizontal frame member and connected to said wing members.

6. The combination according to claim 5, wherein said bracket is movably mounted on said boom member.

7. The combination according to claim 6, including indexing means on said bracket and said boom member for holding said bracket to said boom member at one of a plurality of predetermined positions.

8. The combination according to claim 1, including a connector assembly for pivotally connecting said first end of said boom member to the horizontal frame member adjacent its front end, said connector assembly including a base member secured to said boom member, said base member having a pair of opposed upwardly extending legs, a mounting member positioned on said frame member and having depending side members overlying said legs and pivot means for connecting said depending side members to said legs.

9. The combination according to claim 8, wherein said connector assembly includes a core member having outer ends mounted between said depending side members, said core member defining threaded openings at is outer ends, said legs defining leg openings which are aligned with said core member threaded openings and a pair of pivot pins, each of said respective pivot pins extending through a respective one of said leg openings and being engaged in a core member threaded opening.

10. The combination according to claim 9, including a clamp member mounted between said side members and an adjustable screw extending outwardly from said core member, said adjustable screw engaging said clamp member to hold said clamp member against the bicycle frame member.

11. The combination according to claim 8, said bicycle including a vertical post member, wherein said mounting member includes a pair of forwardly projecting ears for positioning on opposite sides of said bicycle vertical post member to limit relative rotation of said boom member and the horizontal frame member.

12. The combination according to claim 1, wherein said support assembly includes a vertically extending receiver bracket having a base fixed adjacent said second end of said boom member and integral upstanding guide members, said support assembly also including a vertically movable mounting frame having a top member and downwardly extending legs positioned adjacent said upstanding guide members, and releasable holding means for holding said legs and said guide members in a predetermined vertical position.

13. The combination according to claim 12, including adjusting means mounted within said vertically extending receiver bracket and engaging said horizontal frame member for adjusting the distance between the horizontal frame member and the boom member.

14. The combination according to claim 1, wherein said seat assembly includes a horizontally extending channel member having front and rear ends mounted at said front end on said upper end of said support assembly and a bicycle seat mounted on said channel member rear end.

* * * * *